UNITED STATES PATENT OFFICE.

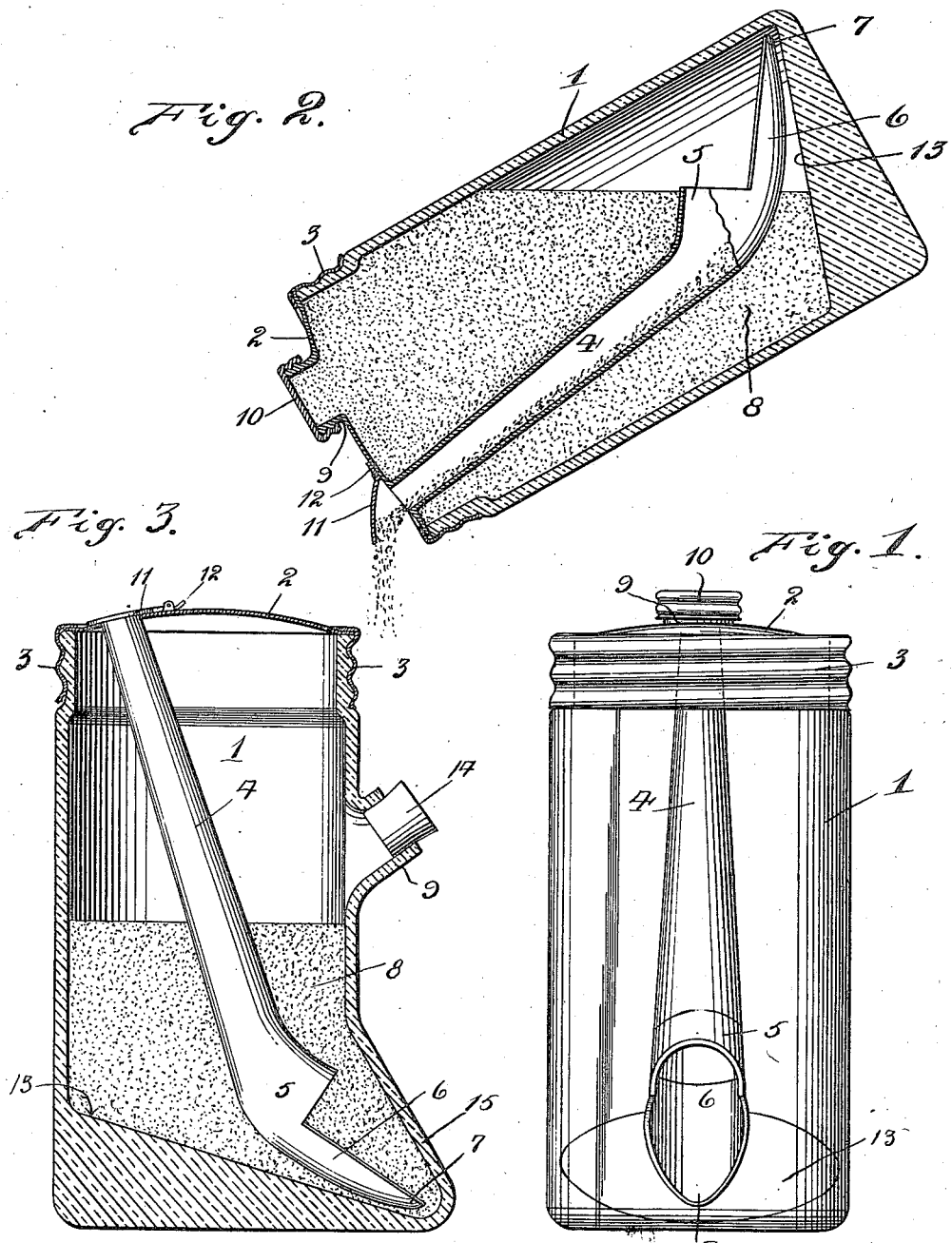

WILLIAM VERNON McBROOM, OF KANKAKEE, ILLINOIS, ASSIGNOR OF ONE-HALF TO VICTOR McBROOM, OF KANKAKEE, ILLINOIS.

SUGAR CONTAINER AND DISPENSER.

1,155,323.  Specification of Letters Patent.  Patented Sept. 28, 1915.

Application filed November 5, 1914. Serial No. 870,491.

*To all whom it may concern:*

Be it known that I, WILLIAM VERNON MCBROOM, a citizen of the United States, residing at Kankakee, in the county of Kankakee and State of Illinois, have invented certain new and useful Improvements in Sugar Containers and Dispensers, of which the following is a specification.

My invention relates to containing and dispensing devices, particularly to a container for granular solids, and has for its object the provision of a device for containing and dispensing sugar in predetermined quantities and designed for domestic and particularly restaurant use.

An important object is the provision of a sugar container so constructed that the sugar can be removed only by tilting the device to cause the sugar to be discharged from the dispensing spout, thus preventing the objectionable and unsanitary practice of dipping into the sugar with a spoon or the like which has been previously used.

Another object is the provision of a device of this character provided with means whereby the sugar within the device will be guided to the dispensing spout so that the device may be used until entirely empty.

An additional object is the provision of a device of this character so constructed as to exclude moisture, insects and dirt, thereby maintaining the sugar or other substance in a dry, clean and sanitary condition.

Other objects and advantages such as simplicity and cheapness in manufacture, ease of operation, efficiency in service, and the general improvement of the art will be carefully brought out in the following description and illustrated in the accompanying drawings, in which:

Figure 1 is a front elevation of my device empty, Fig. 2 is a longitudinal sectional view taken at right angles to Fig. 1 showing the device in use and discharging sugar, and Fig. 3 is a longitudinal sectional view showing a modified form of the device.

Referring more particularly to the drawings, the numeral 1 designates the container portion of my device which though shown as cylindrical and formed of glass, may be constructed of any suitable material and of any desired shape. The closure for the top of the container comprises a disk or plate 2 disposed upon its upper free edge and secured in place by a band 3 threaded exteriorly upon its upper end as shown.

The measuring and dispensing portion of the device comprises a tubular member 4 which is secured to the disk 2 in any suitable manner and which extends downwardly in an inclined direction within the container 1, flaring outwardly at its lower end as shown at 5. Formed integrally or secured upon the portion 5 of the tubular member 4 is a spoon 6 which has its point 7 disposed in proximity to the junction of the side and bottom of the container.

Sugar or any other granular substance 8 is placed in the container by removing the band 3 and plate 2 or by pouring it through the tube 4, though I preferably provide a filling neck 9 on the plate 2 normally closed by a screw cap 10. It will be understood however that the filling neck 9 may be formed on the container and closed by a cork, if desired, as shown in Fig. 3.

It will be obvious that when the container is filled with sugar or the like and is tilted into the position shown in Fig. 2 the sugar upon the spoon 6 will flow into the flared portion 5 and through the tube 4 and will be discharged from the open end thereof as shown in Fig. 2.

In order that moisture, insects and dust may be excluded, I provide a plate 11 pivoted upon the disk 2 and disposed over the open end of the tube 4. When the device is standing in an upright position the plate 11 will cover the open end of the tube and when the device is tilted the plate 11 will swing outwardly as shown in Fig. 2 to permit the discharge of the sugar, a lug 12 being formed on the plate 11 and engaging the disk 2 when the plate is swung open so that it can not swing too far to close properly when the device is returned to an upright position.

In order that the sugar may be guided to the spoon 6 so that it will be properly discharged even though the container is nearly empty, I preferably form the bottom of the container inclined downwardly toward the point of the spoon as shown at 13 so that the sugar will always slide toward the point of the spoon.

In Fig. 3 I have shown a slightly modified form of the device. In this form I have shown the neck 9 on the side of the container and closed by a cork 14, and in addition to employing an inclined bottom 13, I form a bulge 15 in the side wall of the container, the inside bottom of the bulge forming a continuation of the inclined bottom 13 of the container. In this form of the device the tube 4 is more inclined so that the point 7 of the spoon 6 will be disposed adjacent the bottom and front wall of the bulge, thus insuring that absolutely all of the sugar will be taken up by the spoon and discharged through the tube 4.

Having thus described my invention what I claim is:

1. A device of the character described comprising a container, a removable closure therefor, a discharge spout within said container and secured to said closure and discharging therethrough, a shallow oval shaped bowl member secured on the lower end of said spout and extending in proximity to the junction of the wall and bottom of said container, the bottom of said container being inclined downwardly toward the point of said spoon.

2. A device of the character described comprising a cylindrical container, the outside face of the bottom of said container being flat, and the inside face of said bottom inclined to the outside face, a detachable screw top secured on said container, said top having an opening therein closed by a screw cap, a discharge spout disposed in an inclined direction within said container and connected with and discharging through said top, and a spoon formed on the bottom end of said discharge spout, the point of said spoon being in close proximity with the lowest inside point of said container.

3. A device of the character described comprising a cylindrical container, a removable closure on said container, a discharge spout within said container and secured to said closure and discharging therethrough, said spout being of much greater dimensions at its lower end than at its upper end, the lower end of said spout flaring outwardly to form a receiving portion, and a spoon secured to said flaring portion of said spout, the flared portion also serving as a shield to prevent an excess of the material entering said tube.

4. A device of the character described comprising a cylindrical container, a removable closure on said container, a discharge spout within said container and secured to said closure and discharging therethrough, said spout having its bottom portion flared outwardly to form a receiving portion, and an ovoid bowl portion secured at an angle to said spout.

In testimony whereof I hereto affix my signature in the presence of two witnesses.

WILLIAM VERNON McBROOM.

Witnesses:
 C. E. MILLER,
 J. BERT MILLER.